United States Patent [19]

Daggett

[11] Patent Number: 4,508,412

[45] Date of Patent: Apr. 2, 1985

[54] FUSE HOLDER

[75] Inventor: Charles W. Daggett, Mt. Prospect, Ill.

[73] Assignee: Littelfuse, Inc., Des Plaines, Ill.

[21] Appl. No.: 355,907

[22] Filed: Mar. 8, 1982

[51] Int. Cl.[3] ........................ H01R 13/68; H02B 1/02

[52] U.S. Cl. ........................... 339/126 R; 339/147 R; 339/203; 337/237

[58] Field of Search ........... 339/125 R, 126 R, 130 R, 339/147 R, 150 F, 201, 203, 252 F, 262 F; 337/213, 227, 228, 229, 230, 237

[56] References Cited

U.S. PATENT DOCUMENTS

| | | | |
|---|---|---|---|
| 2,591,949 | 4/1952 | Lindell et al. | 339/150 F |
| 2,758,295 | 8/1956 | Sundt | 337/213 X |
| 3,891,292 | 6/1975 | Blight et al. | 339/125 R X |
| 4,329,006 | 5/1982 | Gale | 339/126 R X |
| 4,390,225 | 6/1983 | Coyne et al. | 337/213 X |

*Primary Examiner*—Eugene F. Desmond
*Assistant Examiner*—Steven C. Bishop
*Attorney, Agent, or Firm*—Russell E. Hattis

[57] ABSTRACT

A panel mountable fuse holder for cartridge-type electrical fuses features a one-piece side terminal connection and a one-piece rear terminal connection. Both are configured for radial snap-in engagement with the fuse holder body. A novel capture mechanism in a sleeve disposed within an insertion knob assembly provides electrical contact to the forward fuse terminal without unduly stressing substantially misaligned caps. The capture mechanism also provides moderate rotational torque to the fuse during insertion, whereby the fuse is partially rotated to provide improved electrical contact to a planar ring structure integral with the rear terminal connection.

25 Claims, 16 Drawing Figures

Fig 6
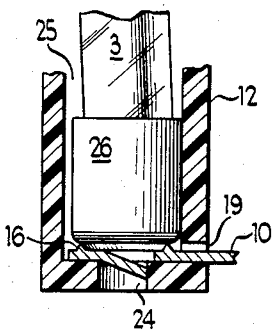
Fig 7
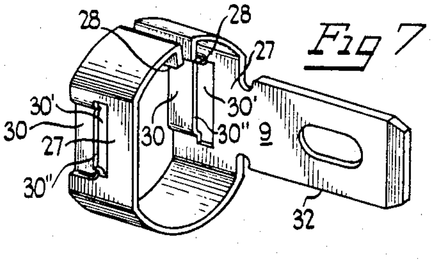
Fig 8
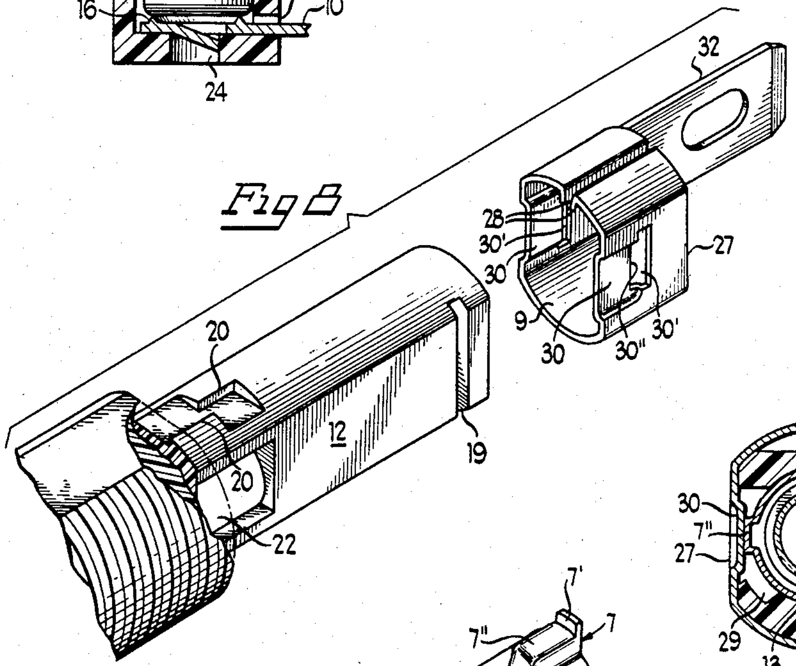
Fig 9
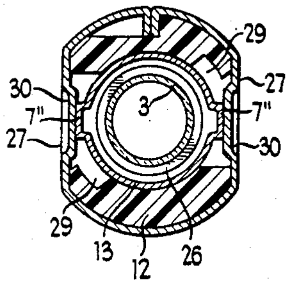
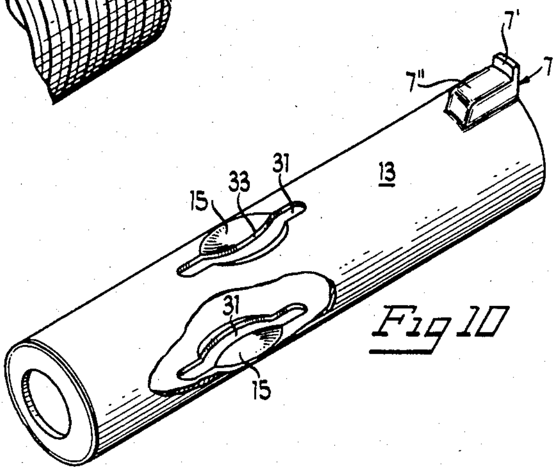
Fig 10

FUSE HOLDER

BACKGROUND OF PRIOR ART

A variety of panel mountable fuse holders exist which are designed to insertingly accept and retain cylindrical cartridge fuses. Such holders are in general cylindrical in shape and have a panel mountable body made of insulating material. The body itself is usually provided with a threaded shoulder on the front end for mounting to a panel through a hole, a matching nut being thereafter slipped over the body and rotated into engagement along the threads. An axial cylindrical passage entering the body from the front of the fuse holder is configured to accept inserted fuses in a completely enclosed manner, the front of the holder being sealed shut by a fuse carrying rotary engaging knob assembly of some form, the knob typically containing a sleeve for receiving and holding the front terminal of the inserted fuse. A rear contact at the rear of the cylindrical passage communicates with an electrical connecting lug on the outside of the fuse assembly for lead attachment. Electrical connection with the forward end of the inserted fuse is typically achieved by a side terminal assembly positioned about and within a central section of the fuse holder body, the side terminal assembly being characterized generally by one or more conducting elements wholly or partially within the fuse holder body configured to engage the conducting sleeve in the knob assembly by rotary engagement as the knob assembly is rotated into a locking position. Additional compression means are typically provided for urging the fuse either into the conducting sleeve of the knob assembly or alternatively against the end terminal at the rear of the fuse passage in the body of the fuse holder. This is most typically effected by employing a spring associated either with the sleeve or with the end contact of the holder. Such compression means are normally considered essential to insure adequate contact with both ends of the inserted fuse so as to keep contact resistance at a minimum in order to avoid overheating the fuse itself, thereby effectively lowering its amperage rating.

Prior art fuse holders of this general type have a variety of disadvantages, mostly in cost, complexity, and overall size. In such fuse holders, end terminal assemblies are commonly axially inserted either from inside or outside the fuse holder body, carrying some form of lug at the outer end for lead attachment thereto. If inserted from the inside of the fuse holder body, a fundamental limit is placed on the size and shape of the end terminal if it is to pass through the exit passage at the end of the body. If inserted from outside the body, an additional element of the assembly is necessary to be disposed inside to provide adequate area for electrical contact, thereby adding to the cost of the assembly. It is an object of the invention to provide in the fuse holder an inexpensive one-piece end terminal contact of adequate interior dimension to provide adequate electrical contact to the inserted fuse.

It is desirable that an end terminal having a selected terminal lug configuration be readily insertable into a standard fuse holder body or, once assembled into the fuse holder body, be readily removable. If such a feature is provided, then an error in terminal lug specification on the manufacturer's part or an error in description on the customer's part may quickly be rectified, a feature frequently unavailable in more complex end terminal assemblies, which frequently involve irreversible riveting or staking operations in their manufacture. Such a feature would also be useful in the reconfiguration of existing installations by electricians, where a change of terminal lug form would accommodate, for example, an extra lead. Accordingly, it is an object of the invention to make the inserted end terminal readily removable and replaceable, preferably by simple means requiring no special tools.

As previously mentioned, contact is made to the front end of the inserted fuse by means of a conducting sleeve carried in an insulated knob assembly, the sleeve penetrating into the axial passage in the fuse holder body to contact by rotary engagement elements of the side terminal and make electrical contact thereto, whereby both the fuse terminals are placed safely behind the mounting panel so as to minimize shock hazards arising from accidental contact with the exterior elements of the fuse holder terminals. One side terminal design heretofore developed is in the form of a multi-piece assembly, involving a sleeve-like element inserted into the bore passage of the fuse holder body and held in place by mechanical engagement with an externally mounted ring positioned about the central region of the fuse holder body and penetrating therethrough so as to capture and contact the side terminal sleeve.

Side terminals configured for such engagement suffer generally from complexity, requiring a multiplicity of components in their assembly, as well as lack of reconfigurability, in that the side terminal is typically irreversibly inserted during fuse holder assembly by a crimping or staking operation. Thus, once assembled, a different terminal lug assembly cannot be attached unless additional system complexity is added e.g., separate terminal lugs of varying configuration and an associated attachment means to some form of universal side contact assembly All such system complexity adds to manufacturing costs.

A simple one-piece side terminal element for engaging the fuse holder sleeve would represent a substantial cost economy in fuse holder manufacturing, and a reversible engagement means allowing a side terminal means of given lug configuration to be readily replaced by another would represent a significant cost economy for the same reasons previously set forth with respect to the end terminal One approach to this problem is represented by a fuse holder currently marketed by the Bussman Company wherein a single piece side terminal ring is assembled to the fuse holder body by sliding it forward along the fuse holder body to engage the fuse holder body by snap-in engagement. Longitudinally extending unitary ring projections reach forward to snap into engagement with paraxial passages in an enlarged thread boss, whereby the contacting side terminal is held in place. Bladelike outwardly extending projections on the knob assembly sleeve engage slots in the side terminal ring through passages in the fuse holder body by rotational engagement, thereby completing the circuit from the side terminal ring to the outer end of an inserted fuse.

Such a terminal arrangement has the advantage that it is of the snap-in type, and may be reconfigured at will; however, the fact that the forward-reaching ring securing projections are in axial alignment with the fuse holder body requires that an oversized thread boss be provided to accommodate these securing elements, with the result that the overall diameter of the fuse holder is increased to an unnecessary degree, thereby reducing the density of fuse holder arrays that can be disposed along a given interval on the mounting panel.

Accordingly, a further object of the invention is to provide a one-piece side terminal contact using a snap-in insertion engagement without substantially increasing the overall diameter of the fuse holder, and which can be removed after assembly for reconfiguration as well.

A further problem encountered is that the cartridge electrical fuses available on the market are frequently found to have their end caps tilted substantially off-axis with respect to the central axis of the fuse body. To minimize contact resistance, some means must be provided to assure adequate electrical contact to such tilted end caps, without at the same time inordinately stressing them and running a substantial risk of fuse breakage. One commonly used means whereby this is accomplished involves self-aligning end cups or pistons used in conjunction with a compression spring. Such arrangements are frequently employed to improve contact bewtween the end terminal of the fuse holder with the inserted fuse. Such assemblies are typically expensive to fabricate, requiring a multiplicity of parts, and are also typically non-reconfigurable. Accordingly, it is an object of the invention to provide a simplified end terminal with improved contacting properties to fuses with tilted end caps while retaining the property of reconfigurability.

A similar contacting problem arises with respect to the knob assembly sleeve. Conventional solutions involve the use of one or more extra pieces in the form of a finger-contact of one form or another on the side of an inserted cup, or a similar contact formed by slotting the side of the sleeve to provide one or more such fingers. Such systems suffer either from complexity and concomitant manufacturing expense, or alternatively from poor accommodation to tilted fuse terminals. In general, those contacting systems which accommodate tilted terminals without unduly stressing them are complex. Accordingly, it is an object of the invention to provide a simple contacting system for the knob assembly sleeve which does not unduly stress an inserted fuse with tilted end terminals.

Another problem frequently encountered is the vulnerability of panel-mounting cartridge fuse holders to momentary power interruption if the knob assembly should accidentally be pushed inwards when in the locked condition. In many systems, particularly those involving volatile memory storage elements, such momentary power interruption can be catastrophic. Prior art fuse holder structures which avoid this problem typically do so by use of complex interconnection systems or by relying solely on an edge contact between the fuse holder members. It is a further object of the invention to provide an inexpensive secure side terminal contact that is essentially invulnerable to loss of contact under axial impact.

SUMMARY OF INVENTION

A fuse holder assembly for cartridge fuses, to which the present invention is most desirably applied, features a standard insulating body with an axially disposed fuse accepting passage, a conventional threaded boss for panel mounting, and a body-engaging knob assembly for receiving and holding the front terminal of an inserted fuse in a conducting sleeve in the knob assembly. In accordance with one of the features of the invention, the fuse holder body has a radial slot communicating from the outside of the fuse holder body to the interior end of the fuse passage. An end terminal is configured with a generally strap-like insertion end inserted into said slot to present one major face perpendicular to the passage axis to contact an inserted fuse. The terminal and the standard fuse holder body are configured for radial snap-in insertion engagement. The exterior end of the end terminal may be provided with terminal lugs of arbitrary size and type, and the terminal may be withdrawn and replaced without general disassembly of the fuse holder, providing the desired reconfigurability feature.

According to another feature of the invention, a one-piece side terminal element is mountable around the outside of the fuse holder body by radial snap-in engagement. Portions of this element are slotted to engage radially extending blades on the knob assembly sleeve by rotary engagement, the blades extending through side passages communicating with the central fuse passage to engage the sleeve and make electrical contact thereto. Axial pressure securing the blades against the slot faces is provided by a conventional compression spring mounted in the sleeve. Portions of the side terminal element project inwardly into the body passages to wipingly engage outwardly extending bosses on the knob assembly sleeve to provide additional electrical contact to the sleeve. This wiping contact is maintained in the event that accidental inward thrust on the sleeve momentarily lifts the blades from their seated position against the slot faces, thus providing uninterrupted contact to the fuse. The side terminal element adds no more overall diameter to the assembly than do conventional crimped ring assemblies. The element may be removed at will, and may carry external terminal lugs of arbitrary configuration.

According to another feature of the invention, by providing the inserted portion of the end terminal with a unitary raised ring on the face thereof facing an inserted fuse, and by configuring the fuse passage somewhat larger than the fuse diameter, the rotary engagement of the knob assembly sleeve imparts a rotation to the fuse, whereby the fuse terminal end rotates against the ring. As a result, a slightly off-axis fuse terminal wanders into a self-aligning orientation to provide improved electrical contact to the end terminal without requiring additional parts in the assembly.

According to another feature of the invention, the knob assembly sleeve is configured with slotted compliant fuse terminal engaging dimples unitary with the sleeve, the dimples being of novel design and providing adequate electrical contact to off-axis fuse end terminals without inducing undesirable stress.

The resulting fuse holder is fabricated from a minimum number of parts, and has one-piece side and end terminals which are inserted by radial snap-in engagement from outside the fuse holder body. They may be removed at will to be replaced by terminals of differing lug connector configuration, thereby facilitating rewiring of existing fuse holder installations. An obvious reduction in manufacturing inventory for small-lot operations is similarly achieved. The self-aligning features of the system provide improved electrical contact to fuses with off-axis end caps without unduly stressing them, thereby reducing breakage.

BRIEF DESCRIPTION OF DRAWINGS

FIG. 6 is a partial cross-sectional view showing the engagement of an inserted fuse with tilted end caps contacting a ring structure on the end terminal;

FIG. 7 is a perspective view of a side terminal;

FIG. 8 is a perspective view showing the side terminal of FIG. 7 positioned for engagement with the fuse holder body;

FIG. 9 is a cross-sectional view taken through section line 9—9 in FIG. 3 showing details of the engagement of a fuse holder sleeve with the side terminal; and FIG. 10 is a perspective view of a slotted dimple capture system employed within the fuse holder knob assembly sleeve.

DETAILED DESCRIPTION OF INVENTION

Figure 1:
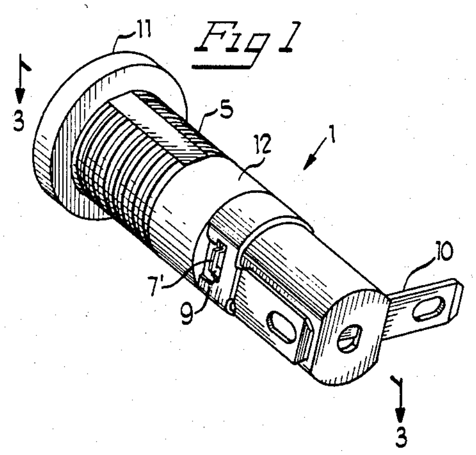
FIGS. 1 and 2 are perspective views of the fuse holder in two different orientations.
Figure 2:
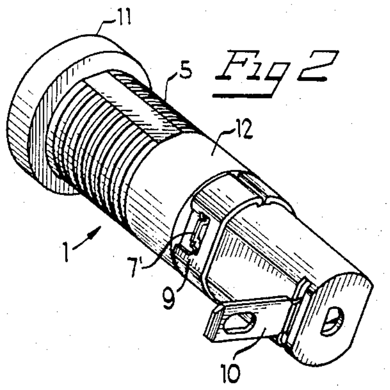

Refer now to FIGS. 1, 2, 3 and 4, which show the exemplary form of the fuse holder 1, which includes an insulating fuse holder body assembly 4 into which a fuse carrying knob assembly 2 is releasably locked. The body assembly 4 shown consists of a body 12 of molded synthetic plastic material having a panel mounting collar 11, a threaded boss 5 for actively engaging a nut (not shown) for mounting on a panel (not shown), and a terminal carrying end portion 12'. The body 12 carries an end terminal 10 on the end portion 12', and a side terminal element 9.

Figure 3:
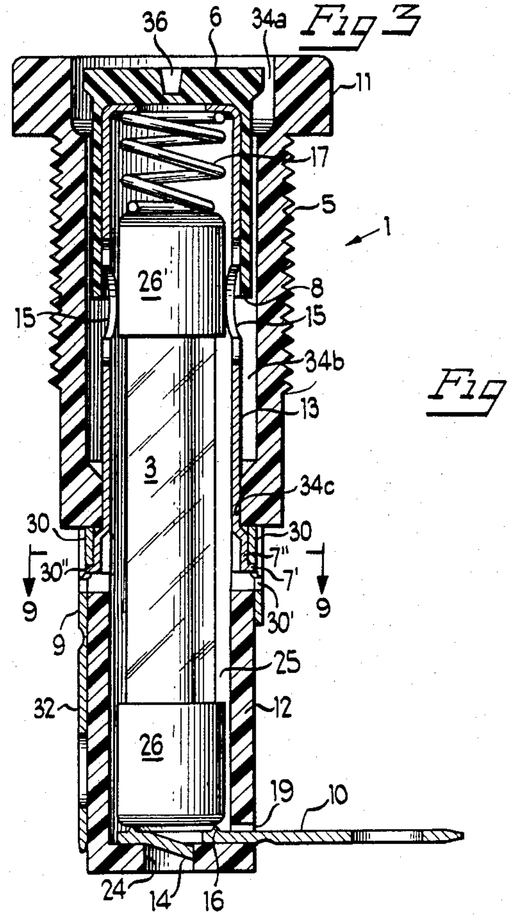
FIG. 3 is a longitudinal cross-section view of the fuse holder assembly containing an inserted fuse.

The fuse knob assembly 2 includes a fuse holder knob 6 holding a conducting sleeve 13 captive within an insulating skirt portion 8, the sleeve itself captively holding a fuse 3 in place. The sleeve 13 has integral outwardly projecting bosses 7, terminating in radially outwardly extending conducting contact blades 7' for engaging slots 30' (See also FIGS. 7 and 8) in the side terminal 9 by rotary engagement after sleeve insertion. FIG. 3 shows the fuse 3 held captive by two concave dimples 15 pressing against a forward fuse end terminal 26' and by a captive spring 17 compressively urging the knob assembly 2 outward to be restrained against this motion by engagement of the blades 7' against the forward or upper margins 30'' of the slots 30' in the side terminal 9. The forward margins 30'' of the slots 30' are defined by the rear edges of indented portion 30 of the flat side walls 27 of the side terminal 9, as will subsequently be more fully described. The indented portions 30 project into side apertures 22 in the fuse holder body, where they can be contacted by the sleeve lug 7.

Figure 5A:
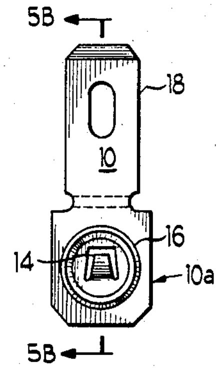
FIGS. 5A and 5B are a plan elevation and a cross-sectional side view of an end terminal of the fuse holder.
Figure 5B:
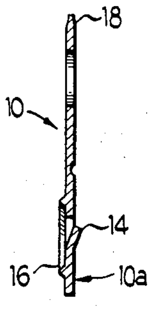

FIGS. 5A and 5B show details of the end terminal 10. The end terminal 10 is a strap-like metallic element, preferably a stamping, configured as a one-piece element in planar form having a raised ring contact 16 on one side of an insertion end portion 10*a* thereof. An outwardly projecting centrally disposed locking tab 14 is centered in the ring contact on the insertion end portion of the end terminal. The end terminal has its opposite end configured with a suitable attachment lug 18.

Figure 5G:
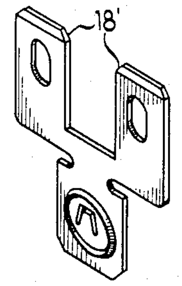
FIG. 5G is a perspective view of an alternative end terminal bearing two terminal lugs.
Figure 5D:
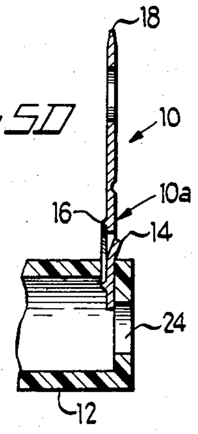
FIGS. 5C and 5D are respectively a rear elevation and a cross-sectional side view of the rear portion of the fuse holder with the end terminal partially inserted.
Figure 5C:
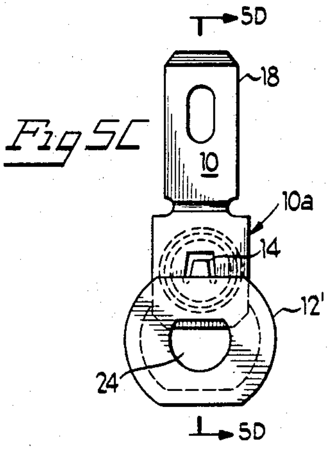

FIGS. 5D and 5C are cross-sectional and elevational views respectively, showing the end terminal 10 partially inserted into the end portion 12' of the standard fuse holder body 12 via a radial side passage 19 (See also FIGS. 6 and 8).

Figure 5F:
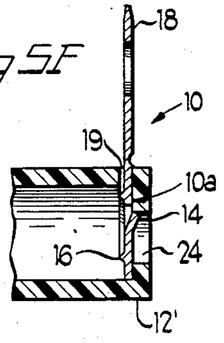
FIGS. 5E and 5F are corresponding views of the same structure with the terminal fully inserted.
Figure 5E:
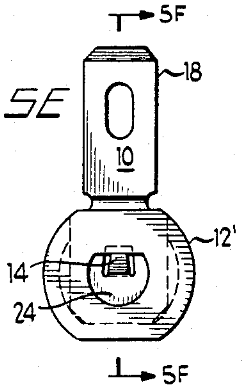

FIGS. 5E and 5F show the end terminal 10 fully inserted and retained in position by engagement of the tab 14 with an axial hole 24 in the end of the fuse holder body 12'. The end terminal 10 may be selected to have any desired terminal lug configuration, and it can be removed simply by pressing inward with a sharp-pointed tool on the tab 14 and withdrawing the terminal 10 by pulling on the terminal lug portion 18. By this means, an installed fuse holder can be reconfigured at will. Thus, for example, a terminal with two terminal lugs 18' (see FIG. 5G) on the end may be used to replace a single terinal lug in a given installation to bring extra leads into contact with the system.

FIG. 6 is a cross-sectional view of the end terminal 10 contacting the rear end terminal 26 of an inserted fuse 3, and illustrates a commonly encountered problem in the case of inexpensive cartridge-type fuses, namely excessive off-axis tilt (here greatly exaggerated) of the fuse terminals with respect to the fuse axis. It is essential that good electrical contact be made to any fuse of the melting link variety in order to avoid hot spotting and accidental degrading of the fuse amperage. It is equally important to do so in a manner that does not excessively stress the fuse cap, because the attachment methods used for securing fuse caps to fuse bodies results in structures which are rather fragile. Thus, excessive force must be avoided, and typically rather complex compliant structures involving spring-loaded pistons with a measure of rotational capability about the fuse axis are frequently employed.

The method shown in FIG. 6 represents a simple solution to this problem. By configuring the fuse passage 25 somewhat overbore, and by using such a raised ring end contact 16, then upon inserting the fuse 3 into the holder and rotating the knob assembly 2 of FIG. 4 into contacting engagement with the body assembly 4, the holder rotation is imparted to the fuse 3, whereby it wanders across the ring to establish a substantially coplanar contact with the inner surfaces of ring 16, thereby seating the fuse in adequate electrical contact without applying excessive stress to the fuse terminal 26.

The details of the side terminal engagement will next be discussed. FIG. 8 is an exploded view of the fuse holder body 12 and the side terminal 9 before assembly of the two. The side terminal 9 (See also FIG. 7) is of one-piece construction of metallic spring stock and consists of a hoop-shaped front structure with a rearwardly projecting terminal lug 32, the hoop having two substantially flat sides 27 and two locking tabs 28 at the top, the hoop being stressed in a direction such as to pull the locking tabs 28 away from each other. Oppositely disposed on the leading edge of the hoop are the peviously mentioned indentations 30—30 whose inner faces are positioned to project through the fuse body side passages 22 and wipingly press against the exterior faces 7'' of the bosses 7 of the knob assembly sleeve 13 shown in FIG. 10 (See also FIG. 3). The slots 30' in the sides 27 of terminal 9 enable the rotation of the knob assembly 2 to interlock the sleeve blades 7' with the side terminal. The rear margin or edges 30'' of the indented portion 30 of the side terminal 9 are arcuately configured for positive locking engagement with the sleeve blades 7' (See FIGS. 3 and 4).

The fuse holder body 12 is configured with large entrance passage portions 34*a* and 34*b* capable of accepting the skirt 8 on the knob assembly 2 shown in FIG. 3, the passage portion 34*b* joining a reduced passage portion 34*c* in the interior of the body, the portion 34*c* joining a further reduced portion 25.

The side terminal 9 is slipped forward over the fuse holder body 12 until the locking tabs 28 thereof are in position over locking shoulders 20 of the fuse holder body 12, at which time the indented portions 30 on the side terminal 9 are located opposite the side apertures 22 in the fuse holder body. By pressing the flat portions 27 of the side terminal 9 together, the locking tabs 28 engage the locking shoulders 20 to anchor the side terminal to the fuse holder body 12, at the same time disposing the indented portions 30 defining slot edges 30" to project inwardly into the side passages 22. A pair of key-way passages 29 (See FIG. 9) in the fuse holder body 12 serves to orient the inserted knob assembly sleeve 13 to a non-engaging position with respect to the sleeve blades 7' until these blades (See FIG. 8) have traveled rearwardly past the indented portions 30, at which time rotation of the knob assembly 2 rotates the blades 7' of the sleeve into slots 30'. Spring pressure from the compression spring 17 (See FIG. 3) in the knob assembly 2 of FIG. 4 pushing on the inserted fuse urges the knob assembly forward, to force the sleeve blades 7' of the sleeve 4 into detent pressure engagement with the arcuate portions 30" of the slot edges 30" of the indented portions 30 of the side terminal 9, thereby assuring adequate electrical contact and a positive locking engagement. It will also be noted in FIG. 3 that the outer faces 7" of the contacting bosses 7 of sleeve 13 are disposed in wiping contact with the interior faces of the indented portions 30 of the side terminal 9. This is accomplished by disposing the outer faces 7" of the contacting bosses 7 sufficiently far out from the body of the sleeve 13 that upon rotation of the sleeve after knob assembly insertion, the indented portions 30 of the side terminal 9 are forced outward against their natural spring tension to create a strong contacting pressure against the boss outer faces 7".

Although FIG. 3 shows a screwdriver slot 36 on the face of the fuse holder knob 6, with the knob face substantially protected from accidental contact by the mounting collar 11, alternative versions of the fuse may readily be provided with an extension knob of a type well known in the art and configured to be grasped by the operator's fingers for fuse insertion and removal without the use of a screwdriver. Such protruding knobs may be accidentally struck to impel the knob assembly 2 momentarily inward, thereby momentarily breaking the contact between the blades 7' (See FIGS. 10 and 3) of the sleeve 13 with the arcuate portions 30" of the shoulder 30. Absence of the extra facial contact provided by boss surfaces 7" would cause a momentary loss of power. The present design thus provides a simple one-piece side terminal connector 9 configured to make a secure four-point contact to the fuse holder sleeve 13.

Figure 4:
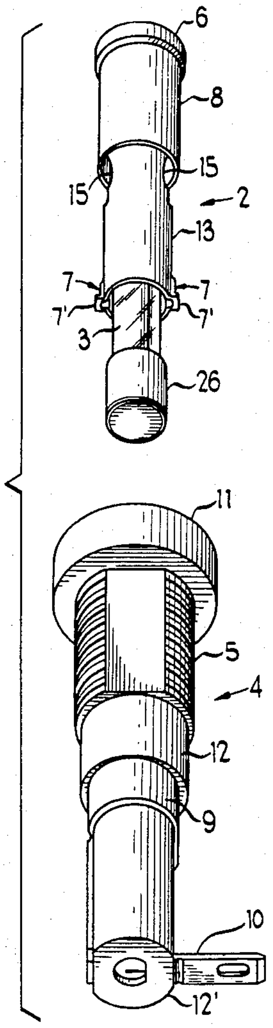
FIG. 4 is an exploded view of the assembly of FIG. 3 wherein a knob assembly carrying an inserted fuse is ready for insertion.

FIG. 10 shows details of the sleeve 13 of FIGS. 3 and 4. A unique form of electrical contact is provided by fashioning the sleeve 13 with two oppositely disposed inwardly facing dimples 15 configured in the form of portions of caps of spherical or cylindrical shells. Each dimple 15 is provided with a slot 31 running down the center thereof, with the slot axis oriented parallel to the central axis of the sleeve. Each half of a dimple, thus, presents inwardly a compliant blade-like contact configured in the form of a circular arc 33 as shown in FIG. 10. The circular profile of each pair of engaging blades thus insures adequate electrical contact to the side of a cylindrical fuse end terminal, even in the case of a misaligned end cap, similar to the situation shown in FIG. 6, illustrating the same problem encountered against the rear terminal 10 of the assembly. The two dimpled structures of FIG. 10 assist in the fuse alignment to the end terminal 10 shown in FIG. 6, in that the dimple half contacts, being close together in pairs, are sufficiently strong to provide adequate electrical contact to the front terminal of the fuse, and are also capable of transmitting enough axial torque to the fuse axis to rotate the fuse during insertion so as to insure the seating against the end terminal 10 as shown in FIG. 6, while at the same time allowing adequate low-stress contact to badly off-axis fuse caps, thereby facilitating the engagement to the fuse end contact 26.

Thus, a simplified fuse holder assembly has been described, wherein the number of necessary parts is held to an absolute minimum, and wherein the overall small diameter of conventional fuse holder assemblies is retained. A one-piece side terminal means, and a one-piece end terminal means, both readily fabricated by simple techniques all known to the art are secured to the assembly by simple snap-in engagement. A novel alignment system at the rear terminal cooperates with a novel capture system in the fuse sleeve to provide adequate electrical contact to the fuse without unnecessarily stressing the fuse during insertion, the system providing substantial allowance for misaligned end caps without unduly stressing them. Both the side terminal and the end terminal are configurable at will, and can be removed by simple snap-out disengagement to allow their reconfiguration to a variety of forms of connector.

While for the purpose of illustration, various forms of this invention have ben disclosed, other forms thereof may become apparent to those skilled in the art upon reference to this disclosure and, therefore, this invention shall be limited only by the scope of the appended claims.

1. In a panel mounting fuse holder having an insulating body to be mounted on a panel and passing therethrough, said body including a fuse-receiving passageway, said body having an end terminal for making electrical connection to the opposite end terminal of cartridge-type fuse inserted into an open forward end of said passageway, said fuse holder further including a knob assembly having an insulated body portion carrying on the rear end thereof a longitudinally extending electrically conducting cylindrical sleeve open at the rearwardly facing end thereof to receive the front end of said fuse and electrically connected with the front end terminal thereof, said fuse holder further including a side terminal for making electrical connection to said sleeve and locking means for securing said knob assembly to said fuse holder, the improvement wherein said sleeve has integrally formed thereon at least one externally concave depression forming an inward projection on the wall of said sleeve and positioned thereon to contact the front end terminal of said inserted fuse on the cylindrical side thereof, the margins of said depression being spaced from the end of the sleeve, said depression having slot means extending therethrough to intersect said projection at the region of maximum inward extension thereof, said slot means extending substantially at least between the opposite margins of the depression and terminating short of the ends of the sleeve, so that said slot means serves to decrease the local rigidity of its associated projection in the region of contact with said cylindrical side of said front end terminal to provide resilient capture of and electrical contact to said end terminal.

2. The fuse holder of claim 1 wherein a plurality of said depressions are disposed circumferentially about said sleeve, each said depression having said slot means associated therewith, so that a plurality of said inward projections are disposed to engage said cylindrical side of said front end terminal.

3. The fuse holder of claim 1 wherein said depression is configured as an inwardly projecting dimple, said slot means being a single slot centrally disposed therein and extending across the region of maximum inward extension of said dimple.

4. The fuse holder of claim 3 wherein the axis of each said slot is parallel to the axis of said sleeve.

5. The fuse holder of claim 1 wherein said depression is configured as an inwardly projecting substantially circular dimple.

6. The fuse holder of claim 5 wherein said slot means is a single slot centrally disposed in and extending across the region of maximum inward extension of said dimple.

7. The fuse holder of claim 1 wherein said slot means extends beyond the margins of said depression.

8. In a fuse holder for cartridge type electrical fuses having end terminals and comprising an insulated fuse holder body having a central first passage for accepting an inserted fuse, end terminal contacting means disposed at the rear or interior end of said passage for making an electrical contact to the inserted first end of said fuse and providing a conducting path therefrom for lead attachment outside said fuse holder body, a knob assembly comprising an insulating knob carrying a conducting sleeve therein configured to engage and electrically contact the front or opposite end of said fuse, said knob, said sleeve and said first passage configured such that said sleeve and portions of said knob can be insertingly accepted by said body to capture said fuse between said sleeve and said end contacting terminal means, and retention means for holding said knob assembly in place after the insertion of said sleeve and said fuse in said first passage, the improvement comprising:

an electrically conducting one-piece side terminal mounted on the outside of said body, said body being configured with unitary complementary anchoring portions to secure said side terminal to said body by snap-in engagement thereof, said fuse holder body having at least a pair of side passages oppositely disposed about the axis of said first passage and passing from the outside of said fuse holder body to said first passage, said side terminal being configured with at least a pair of inwardly projecting contacting means disposed to project inwardly into said side passagese, and said sleeve includes at least a pair of engaging means disposed to pressingly contact said inwardly projecting contacting means through said side passages when said sleeve of said knob assembly is inserted into said body, and retained by said retention means.

9. The fuse holder of claim 8 wherein said side terminal is provided with slot means disposed at the rear of said inwardly projecting contact means and opposite each side passage of said fuse holder body, said sleeve being provided with conducting outwardly extending blade means configured for rotational touching engagement with a forward edge defining said slot means by rotation of said assembly after insertion thereof into said body.

10. The fuse holder of claim 9, wherein said inwardly projecting contact means of said side terminal includes first shoulder means disposed opposite each side passage of said pair of side passages, and said sleeve includes outwardly projecting second shoulder means disposed to wipingly pressingly contact said first shoulder means through said pair of side passages when said blade means of said sleeve is rotated into said rotational touching engagement within said slot means, so as to provide additional electrical contact between said sleeve and said side terminal means.

11. The fuse holder of claim 10 further comprising axial pressure-applying means for supplying an axial force to said sleeve in an outward direction when said sleeve is inserted into said body, and said retention means include said rotary engagement of said blade means and said slot means, said engagement preventing said pressure applying means from expelling said sleeve, said pressure-applying means forcing portions of said blade means against at least one wall defining said slot means into arresting contact.

12. The fuse holder of claim 11 wherein said pressure-applying means is a compression spring disposed within said sleeve to be compressed by a fuse inserted therein.

13. In a fuse holder for cartridge type electrical fuses having end terminals and comprising an insulated fuse holder body having a first passage for accepting an inserted fuse, end terminal contacting means disposed at the rear or interior end of said passage for making an electrical contact to the inserted first end of said fuse and providing a conducting path therefrom for lead attachment outside said fuse holder body, a knob assembly comprising an insulating knob carrying a conducting sleeve therein configured to engage and electrically contact the front or opposite end of said fuse, said knob, said sleeve and said first passage configured such that said sleeves and portions of said knob can be insertingly accepted by said body to capture said fuse between said sleeve and said end contacting terminal means, and retention means for holding said knob assembly in place after the insertion of said sleeve and said fuse in said first passage, the improvement comprising:

an electrically conducting one-piece side terminal mounted on the outside of said body and having radially internally projecting anchoring means, said body being configured with unitary complementary anchoring portions to secure said side terminal to said body by radially inward snap-in engagement thereof with said anchoring means, said body being configured with at least one radially extending side passage passing from the outside of said fuse holder body to said first passage, regions of said sleeve and regions of side terminal being configured for mutual engagement through said at least one side passage whereby electrical connection is achieved between said side terminal connection and said sleeve to make electrical connection with said front end of said fuse, and said radially internally projecting anchoring means of said side terminal being separate from the regions of said side terminal opposite said at least one side passage of said body.

14. In a fuse holder for cartridge-type electrical fuses having cylindrical contacts with substantially planar ends at a first and second end thereof, said fuse holder including an insulating fuse holder body having a first passage extending at least partially thereinto and configured to accept and confine an inserted fuse to reside with said first terminal end disposed proximate to the inner end of said passage, a knob assembly engageable with said body, said knob assembly including fuse engaging means for capturing an inserted fuse at said second end and for making electrical contact with said terminal thereat and for providing axial pressure to force said fuse into said first passage when the knob assembly is engaged with said body, said body having front terminal means for providing an electrical connection from outside said fuse holder body to said fuse engaging means, the improvement comprising:

rear terminal means for providing an electrical connection from outside said fuse holder body to said first terminal end of said inserted fuse, said fuse holder body being configured with a radially extending second passage proximate to the interior end of and communicating with said first passage, said rear terminal means being externally mounted on said fuse holder body and having a terminal lug portion outside of said body and of arbitrary dimension with respect to the size of said first passage, and a body-engaging and fuse terminal contacting portion configured to pass into said body through said second passage and lock by snap-in anchoring connection with said body to reside disposed in said first passage to make contact with the terminal at said first end of said fuse.

15. The fuse holder of claim 14, wherein said fuse terminal contacting portion of said rear terminal means is configured generally in the form of an elongated strap and said second passage is configured in the form of a slot for insertingly accepting said contacting portion of said strap.

16. The fuse holder of claim 15 wherein said inserted end has an outwardly extending tab on said elongated strap forming said fuse terminal contacting portion of said rear terminal means, said inner end of said first passage having a matching passage for lockingly engaging said tab by snap-in engagement upon insertion of said strap.

17. The fuse holder of claim 16 wherein said knob assembly engages said body by rotation of said knob assembly about the axis of said first passage after insertion, said capturing means including means for transmitting torque to rotate said second end of said fuse about the axis of said first passage during said rotation of said knob assembly, said means for providing torque providing said torque over substantial angles of misalignment between said passage axis and the axis of said fuse, and wherein said end terminal contact means is configured and disposed to present a ring-shaped contacting surface facing the planar second end of said inserted fuse, said ring-shaped contacting surface having its center disposed on the axis of said first passage with the plane of said ring disposed perpendicular thereto, the diameter of said ring being configured substantially less than the diameter of said planar end, a portion of said first passage proximate to said end contact means being configured to have diameter greater than the outer diameter of said end terminal so that during said rotation of said engaging means a cooperation of said pressure and said torque rotate said planar face of said second end contact into matching planar contact with at least a portion of said ring so that improved electrical contact to said planar face can be secured in the event of misalignment between the axis second end contact and the body of said fuse.

18. In a fuse holder for cartridge type electrical fuse having end terminals with end faces and comprising an insulated fuse holder body having a first passage extending therethrough for accepting an inserted fuse, end terminal contacting means disposed at the interior end of said passage for making an electrical contact to the inserted first end of said fuse and providing a conducting path therefrom or lead attachment outside said fuse holder body, a knob assembly comprising an insulating knob carrying a conducting sleeve therein, said sleeve configured to engage and electrically contact the front end of said fuse, said knob, said sleeve and said first passage configured such that said sleeve and portions of said knob can be accepted by said body to capture said fuse between said sleeve and said end contacting terminal means, and retention means for holding said knob assembly in place after the insertion of said sleeve and said fuse in said first passage, the improvement comprising:

an electrically conducting one-piece side terminal mounted on the outside of said body, said side terminal providing external electrical connection to said sleeve when said sleeve is inserted in said body, and having radially inwardly extending anchoring means, said body being configured with complementary anchoring portions to secure said side terminal to said body on radially inward snap-in engagement thereof, said body being configured with at least one radially extending side passage passing from the outside of said fuse holder body to said first passage, regions of said sleeve and regions of side terminal being configured for mutual engagement through said at least one side passage whereby electrical connection is achieved between said side terminal connection and said sleeve to make electrical connection with said outer end of said fuse, and said side terminal being provided with slot means disposed opposite said at least one side passage, and said sleeve is provided with radially outwardly extending blade means configured for rotational touching engagement with at least one wall defining said slot means by rotation of said knob assembly after insertion thereof into said body.

19. In a fuse holder for cartridge type electrical fuses having end terminals, said fuse holder comprising an insulated fuse holder body having a first passage extending at least partially therethrough for accepting an inserted fuse, end terminal contacting means disposed at the rear or interior end of said central passage for making an electrical contact to the inserted first end of said fuse and providing a conducting path therefrom for lead attachment outside said fuse holder body, a knob assembly comprising an insulating knob carrying a conducting sleeve therein, said sleeve configured to engage and electrically contact the outer or front end of said fuse, said knob, said sleeve and said first passage configured such that said sleeve and portions of said knob can be insertingly accepted by said body to capture said fuse between said sleeve and said end contacting terminal means, and retention means for holding said knob assembly in place after the insertion of said sleeve and said fuse in said first passage, the improvement comprising:

an electrically conducting one-piece side terminal on the outside of said body, said side terminal having at least one portion projecting radially inward through a passage in said body and presenting axially extending contact surfaces for making good electrical contact with said sleeve, said radially inward projecting portion of said side terminal also forming axially facing shoulder means constituting said knob assembly retension means.

20. The fuse holder of claim 19 wherein said side terminal has a ring-like main body portion slidably disposed on the outside of said body and has projecting radially inward therefrom one or more portions forming anchoring means making snap-in anchoring engagement with said body.

21. The fuse holder of claim 19 wherein said knob assembly is rotated after insertion to move the same to its retained position, and said side terminal envelopes at least half of the fuse holder body and has exposed in said first body passage a pair of said axially extending contact surfaces and a pair of said axially facing shoulder means on diametrically opposite sides thereof which respectively are engaged by diametrically opposed postions of said sleeve.

22. In a fuse holder for cartridge type electrical fuses having end terminals and comprising an insulated fuse holder body having a first passage for accepting an inserted fuse, end terminal contacting means disposed at the rear or interior end of said first passage for making an electrical contact to the inserted first end of said fuse and providing a conducting path therefrom for lead attachment outside said fuse holder body, a knob assembly comprising an insulating knob carrying a conducting sleeve therein, said sleeve being configured to engage and electrically contact the opposite or front end of said fuse, said knob, said sleeve and said first passage being configured such that said sleeve and portions of said knob can be insertingly accepted by said body to captively retain said fuse between said sleeve and said end contacting terminal means, the improvement wherein said body carries an electrically conducting side terminal having exposed on the inside of said body passage a rearwardly facing knob assembly retension shoulder means and at least one axially extending contact surface, relient means for urging a portion of said sleeve axially forward against said retention shoulder means of the side terminal when the knob assembly carrying a fuse is fully inserted into said body and positioned to be retained therein, the knob assembly then being depressible rearwardly against the force of the resilient means over a range of axial positions with respect to said side terminal in response to an inward axial force applied to said knob assembly, and said sleeve includes an axially extending contact surface disposed to provide a continuous wiping, pressing contact with said axially extending contact surface of said side terminal over said range of axial positions of said knob assembly when it is depressed from its retained position.

23. The fuse holder of claim 22 wherein said projecting means on said sleeve projects radially outwardly from said sleeve and is engageable with said shoulder means on said side terminal when said knob assembly is rotated after insertion of said knob assembly and sleeve carried thereby into said fuse holder body.

24. The fuse holder of claim 23 wherein said sleeve has a pair of said axially extending contact faces terminating in a pair of radially outwardly extending projections on opposite sides of said sleeve which engage with corresponding axially extending contact faces and shoulder means on opposite sides of said side terminal.

25. The fuse holder of claim 24 wherein said side terminal is a hoop-like structure enveloping the outside of said body and having radially inwardly projecting portions passing through side passages in said body and forming said contact faces and shoulder means.

* * * * *